Figure 1:
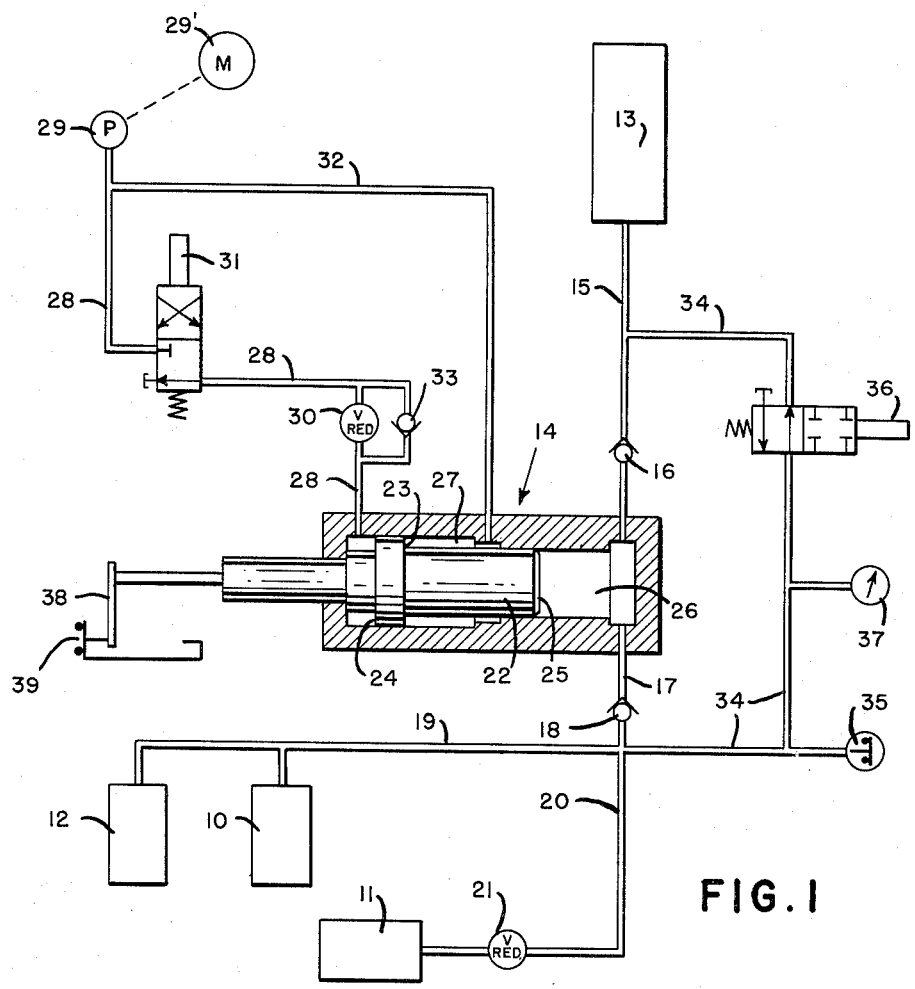

Oct. 12, 1965  E. P. BULLARD III  3,211,254
LUBRICATING SYSTEM
Filed Sept. 5, 1963

INVENTOR.
EDWARD P. BULLARD III
BY
ATTORNEY

United States Patent Office

3,211,254
Patented Oct. 12, 1965

3,211,254
LUBRICATING SYSTEM
Edward P. Bullard III, Fairfield, Conn., assignor to The Bullard Company, Bridgeport, Conn., a corporation of Connecticut
Filed Sept. 5, 1963, Ser. No. 306,820
7 Claims. (Cl. 184—6)

This invention relates to machine tools and particularly to an improved lubricating system for one or more slidable members at one or different locations on machine tools.

Machine tools often include a plurality of slidable members at different locations, such as tool supporting heads. Proper lubrication of such members is often neglected with attendant excessive wear developing between the relative slidable members.

The principal object of this invention is to provide an automatic lubricating system for such members as tool heads of a machine tool.

Another object of the invention is to provide such a system that automatically becomes effective at periodic intervals.

Still another object of the invention is to provide such a lubricating system in which the lubricant is supplied until a predetermined pressure of lubricant is present at all connected points.

Another object of the invention is to provide such a lubricating system in which the predetermined pressure of lubricant is released after each operation of the system.

Still another object of the invention is to provide such a lubricating system which can be rendered effective independently of the means that periodically renders the system effective.

In one aspect of the invention, the various movable members to be lubricated may be connected so that they are all fed from a common line that is connected to one end of a cylinder through a one-way check valve, i.e., permitting flow from the cylinder to the movable members but preventing opposite flow.

In another aspect of the invention, the same end of the cylinder may be connected to a reservoir through a one-way valve permitting flow from the reservoir to the cylinder but preventing opposite flow. The cylinder may include a differential piston that is supplied on its side of minimum area with pressure fluid at a constant predetermined value from a pump that may be driven by the main drive motor of the machine tool, or by a separate motor.

In still another aspect of the invention, the pump may supply pressure fluid to the side of the differential piston of maximum area through a reducing valve and a solenoid operated valve. A check valve may be provided for exhausting the cylinder on the maximum area side of the piston when the solenoid valve is operated to connect that side of the cylinder to drain.

In another aspect of the invention, the line leading to the movable members may contain a return branch leading to the lubricant reservoir through a solenoid operated exhaust valve.

In a still further aspect of the invention, a timing circuit may be provided for periodically rendering the system effective, and it may include a pressure switch for stopping the lubrication and resetting of the timer after a predetermined pressure of the lubricant at all members has been achieved.

In still another aspect of the invention, manual means may be provided for overriding the timer so that upon initially starting the machine tool, all the movable members are lubricated, after which the automatic timing circuit periodically lubricates the movable members as previously mentioned.

The above, other objects and novel features of the improved lubricating system will become apparent from the following specification and accompanying drawing which are merely exemplary.

Figure 2:
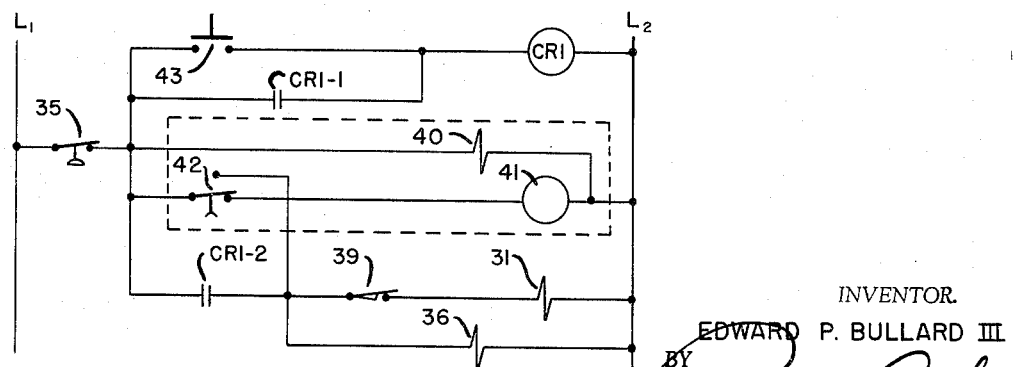

In the drawing:
FIG. 1 is a schematic showing of a lubricating system to which the principles of the invention have been applied; and
FIG. 2 is a wiring diagram for the system shown in FIG. 1.

Referring to the drawing, the principles of the invention are shown as applied to a system for lubricating three tool supporting heads 10, 11 and 12 which are illustrated diagrammatically but which may move in either direction along one or more axes on bearings in a stationary supporting frame. The bearings require periodic lubrication in order to cause the machine tool to retain its accuracy of operation throughout its life.

Lubricant in a reservoir 13 may be conveyed to the front end of a cylinder 14 by a line 15 having a check valve 16 therein which permits flow toward cylinder 14 but not toward reservoir 13. A line 17 having a check valve 18 may lead from the front end of cylinder 14, the check valve 18 permitting flow away from cylinder 14 but not toward it. A branch 19 from line 17 may extend to the tool heads 10 and 12 which may be at the same elevation and may lead to lubrication grooves or other means for conveying the lubricant between the relative movable surfaces of the members 10 and 12 and the bearing surfaces therefor on the frame supporting said members.

Another branch 20 may lead to another head 11, and if it is at a lower elevation than heads 10 and 12, a reducing valve 21 may be provided in line 20 to restrict the flow of lubricant to head 11 so that it will not be favored over heads 10 and 12.

The cylinder 14 may have a differential piston 22 therein having a portion 23 with an area that is less than the area of a portion 24. The forward end 25 of piston 22 acts within a chamber 26 of cylinder 14 that is separate from a chamber 27 thereof within which the differential area portions 23 and 24 of piston 22 are located.

A line 28 leading from the end of cylinder 14 opposite that which is connected to line 17 extends to a pump 29 past a reducing valve 30 and a solenoid operated valve 31. Pump 29 may be connected to the main drive motor 29' of the machine tool. A branch 32 leading from line 28 before valve 31 is connected to the chamber 27 of cylinder 14 and continuously supplies pressure fluid from pump 29 to chamber 27 acting on area 23 to force piston 22 leftwardly. A check valve 33 may be provided in a by-pass around valve 30 to permit exhausting of the cylinder 14 on the side of area 24 of piston 22.

In order to ensure a predetermined pressure of lubricant at each movable member or head 10, 11 and 12, a branch 34 from line 20 may include a pressure switch 35 which functions in a manner to be described.

Obviously, once the predetermined pressure of lubricant at the tool heads has been achieved, it is necessary to relieve it; otherwise binding between the slidable members and their way bearing surfaces may occur. To avoid this, branch 34 leads to the line 15 through a solenoid operated exhaust valve 36. A pressure gauge 37 may be included in branch 34 to indicate the pressure therein at all times.

Referring to FIGS. 1 and 2, energizing of the main drive motor 29' starts pump 29, such energizing being adapted to supply current to lines $L_1$ and $L_2$ (FIG. 2). The pump 29 supplies pressure fluid to chamber 27 of cylinder 14, forcing piston 22 leftwardly, charging chamber 26 with lubricant from reservoir 13 and causing an arm 38 connected to piston 22 to close limit switch contacts 39. Energizing lines $L_1$, $L_2$, with pressure switch 35 closed, energizes clutch solenoid 40 operating timer motor 41. After a preset time, usually one or more hours depending upon the use to which the machine tool is put, timer motor 41 moves time delay switch 42 to its upper position, energizing exhaust solenoid 36, blocking branch 34 leading to reservoir 13. With contacts 39 closed, pump solenoid valve 31 is energized, causing pressure fluid from pump 29 to pass through valve 30 and act on area 24 of piston 22, forcing it rightwardly and forcing the lubricant in chamber 26 to heads 10, 11 and 12. At the end of the rightward stroke of piston 22, arm 38 opens contacts 39, de-energizing pump solenoid valve 31, thereby exhausting the cylinder 14 on the side adjacent area 24. Accordingly, constant pressure in branch 32 forces piston 22 leftwardly, recharging chamber 26 with lubricant and closing contacts 39, thereby initiating another rightward movement of piston 22. This reciprocation of piston 22 continues, supplying repeated charges of lubricant to heads 10, 11 and 12, until the pressure at all heads is at a predetermined value whereupon pressure switch 35 opens, de-energizing the timing circuit.

De-energizing the timing circuit also de-energizes solenoid 36, exhausting branch 34 to reservoir 13, thereby relieving the pressure in the lines 19 and 20 leading to heads 10, 11 and 12 so that they are not bound and therefore are free to operate. When the pressure falls to a predetermined low value due to line 34 being open to reservoir 13, contacts 35 close energizing clutch coil 40, resetting timer 41 which moves contacts 42 to the position shown in FIG. 2. Accordingly, timer motor 41 is re-energized with contacts 42 in the position shown in FIG. 2, initiating another timed cycle of operation which may occur at any predetermined periodic interval, but usually at intervals of one hour or more.

From the foregoing it is evident that in initially starting an operation of the machine tool, it may require an hour or more before heads 10, 11 and 12 are lubricated. To overcome this, an overriding circuit may be provided. Thus, closing push button switch 43 energizes relay CR1, closing CR1–1 contacts, holding the relay energized after release of the push button switch 43. Energizing CR1 relay closes CR1–2 contacts, thereby energizing solenoids 31 and 36, initiating a cycle of operation of piston 22 causing an initial lubrication of heads 10, 11 and 12, after which the timer cycle operation takes over.

Although the various features of the improved lubricating system have been shown and described in detail to fully disclose one embodiment of the invention, it will be evident that changes may be made in such details and certain features may be used without others without departing from the principles of the invention.

What is claimed is:

1. In a machine tool, means slidably movable in either direction along ways attached to a frame; lubricant reservoir means; a line leading from said reservoir means and supplying said slidably movable means; means within said line adapted to receive a charge of lubricant from said reservoir and to deliver said charge to said slidably movable means; timer controlled means for effecting the periodic activity of said charge receiving and delivering means; and pressure responsive means for exhausting said line and for de-energizing said timer controlled means when a predetermined pressure of lubricant has been achieved at said movable means, said pressure responsive means being adapted to re-energize said timer controlled means after the pressure of lubricant at said movable means reaches a predetermined low value.

2. In a machine tool, means slidably movable in either direction along ways attached to a frame; lubricant reservoir means; a line leading from said reservoir means and supplying said slidably movable means; means within said line adapted to receive a charge of lubricant from said reservoir and to deliver said charge to said slidably movable means; timer controlled means for effecting the periodic activity of said charge receiving and delivering means; pressure responsive means for exhausting said line when a predetermined pressure of lubricant has been achieved at said movable means, said pressure responsive means being adapted to re-energize said timer controlled means after the pressure of lubricant at said movable means reaches a predetermined low value; and overriding means for initiating a cycle of operations of said charge receiving and delivering means independently of said timer controlled means.

3. In a machine tool, means slidably movable in either direction along a path of travel on ways attached to a frame; lubricant reservoir means; a line leading from said reservoir means to the slidably movable means; cylinder and piston means within said line and adapted to receive a charge of lubricant from said reservoir and to force said charge to said movable means during the reciprocation of the piston within said cylinder means; timer controlled means for effecting the reciprocation of said piston; and pressure responsive means for exhausting said line and for de-energizing said timer controlled means when a predetermined pressure of lubricant has been achieved at said movable means, said pressure responsive means being adapted to re-energize said timer controlled means after the pressure of lubricant at said movable means reaches a predetermined low value.

4. In a machine tool, a member slidably movable in either direction along a path of travel on ways attached to a frame; a reservoir; a line leading from said reservoir to said member; a cylinder having a differential piston therein and a charging chamber at one end of said piston; an inlet and outlet within said line and leading to and from said charging chamber and connected respectively to said reservoir and said member; a constant supply of pressure fluid connected to the small area of said differential piston; a solenoid operated valve for admitting pressure fluid to the large area of said differential piston; an electrical circuit including a timer for operating time delay contacts for periodically energizing said solenoid operated valve; and limit switch means for de-energizing and energizing said solenoid operated valve at opposite ends of the stroke of said differential piston.

5. In a machine tool, a member slidably movable in either direction along a path of travel on ways attached to a frame; a reservoir; a line leading from said reservoir to said member; a cylinder having a differential piston therein and a charging chamber at one end of said piston; an inlet and outlet within said line and leading to and from said charging chamber and connected respectively to said reservoir and said member; a constant supply of pressure fluid connected to the small area of said differential piston; a solenoid operated valve for admitting pressure fluid to the large area of said differential piston; an electrical circuit including a timer for operating time delay contacts for periodically energizing said solenoid operated valve; limit switch means for de-energizing and energizing said solenoid operated valve at opposite ends of the stroke of said differential piston; and means for exhausting said line when a predetermined lubricant pressure has been established at the slidably movable member.

6. In a machine tool, a member slidably movable in either direction along a path of travel on ways attached to a frame; a reservoir; a line leading from said reservoir to said member; a cylinder having a differential piston therein and a charging chamber at one end of said piston; an inlet and outlet within said line and leading to and from said charging chamber and connected respectively to said reservoir and said member; a constant supply of pressure fluid connected to the small area of said differential piston; a solenoid operated valve for admitting pressure fluid to the large area of said differential piston; an electrical circuit including a timer for operating time delay contacts for periodically energizing said solenoid operated valve; limit switch means for de-energizing and energizing said solenoid operated valve at opposite ends of the stroke of said differential piston; means for exhausting said line when a predetermined lubricant pressure has been established at the slidably movable member; and overriding means for initiating a cycle of operations of said piston independently of said timer.

7. In a machine tool, a plurality of heads slidably movable in either direction along ways attached to a frame; lubricant reservoir means; a common line leading from said reservoir means supplying all of said heads; means within said line adapted to receive a charge of lubricant from said reservoir and to deliver said charge to said slidably movable heads; timer controlled means for effecting the periodic activity of said charge receiving and delivering means; and pressure responsive means for exhausting said line and for de-energizing said timer controlled means when a predetermined pressure of lubricant has been achieved at said movable heads, said pressure responsive means being adapted to re-energize said timer controlled means after the pressure of lubricant at said heads reaches a predetermined low value.

References Cited by the Examiner

UNITED STATES PATENTS

| | | | |
|---|---|---|---|
| 1,968,000 | 7/34 | Wupper | 184—7 |
| 2,384,590 | 9/45 | Baldenhofer | 184—6 |
| 2,597,137 | 5/52 | Tear | 184—7 |
| 3,031,032 | 4/62 | Dinkelkamp et al. | 184—7 |

LAVERNE D. GEIGER, *Primary Examiner.*

MILTON KAUFMAN, *Examiner.*